3,637,728
2-PHENYLBENZOXAZOLE DERIVATIVES
Christian Luethi, Muenchenstein, Switzerland, assignor to Ciba Limited, Basel, Switzerland
Filed June 4, 1969, Ser. No. 830,283
Claims priority, application Switzerland, June 11, 1968, 8,659/68
Int. Cl. C07d 85/00
U.S. Cl. 260—307
3 Claims

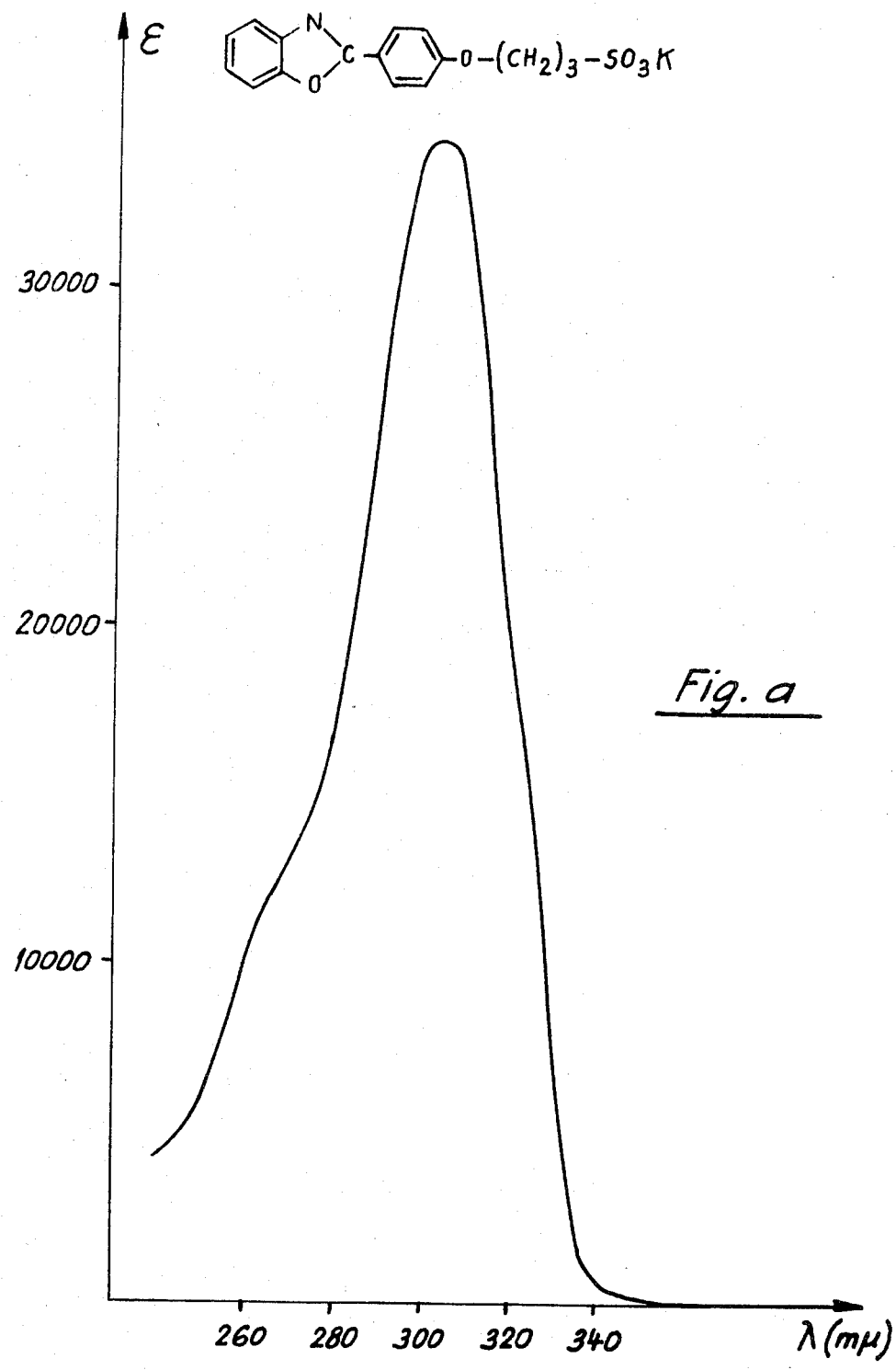
Fig. a

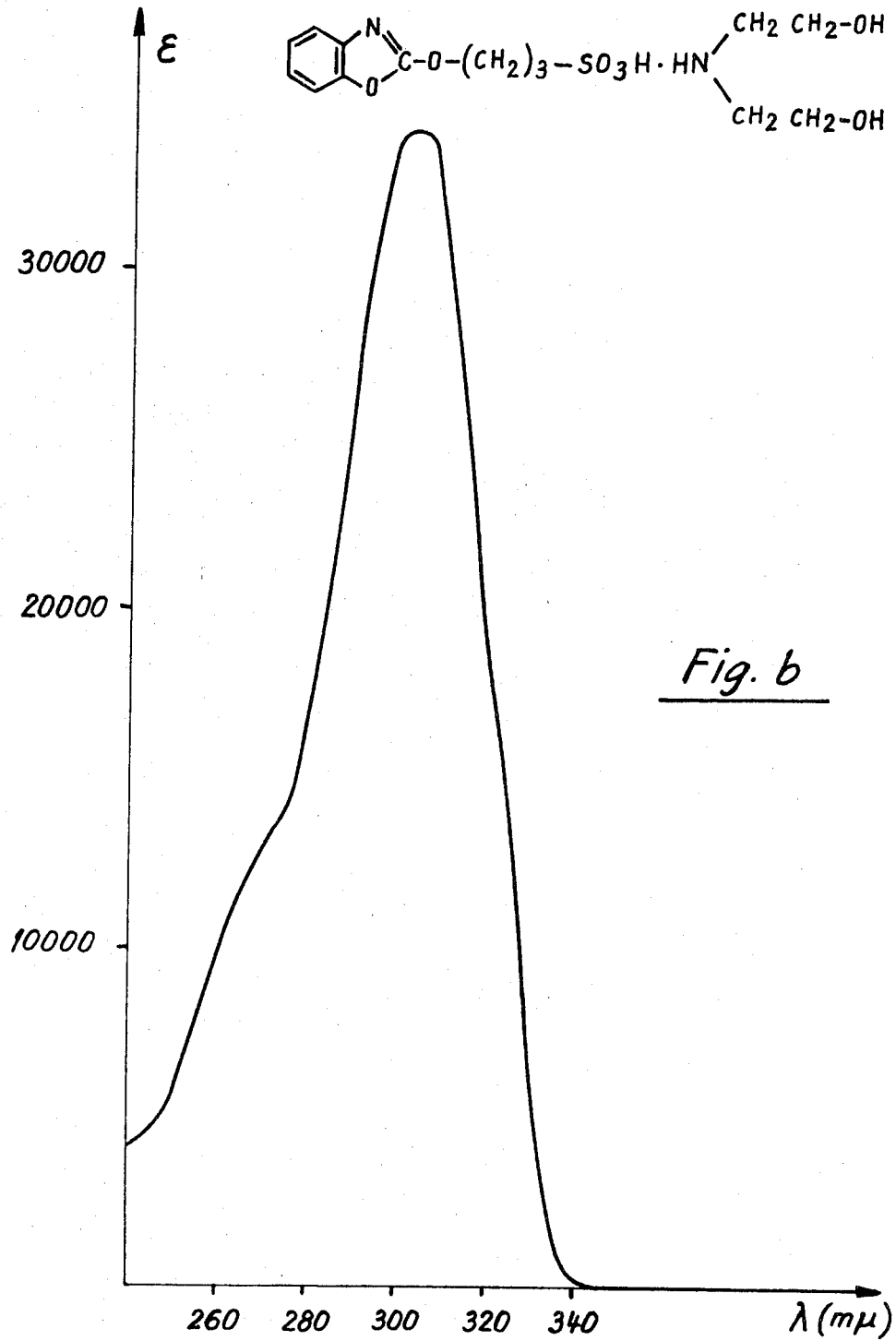
Fig. b

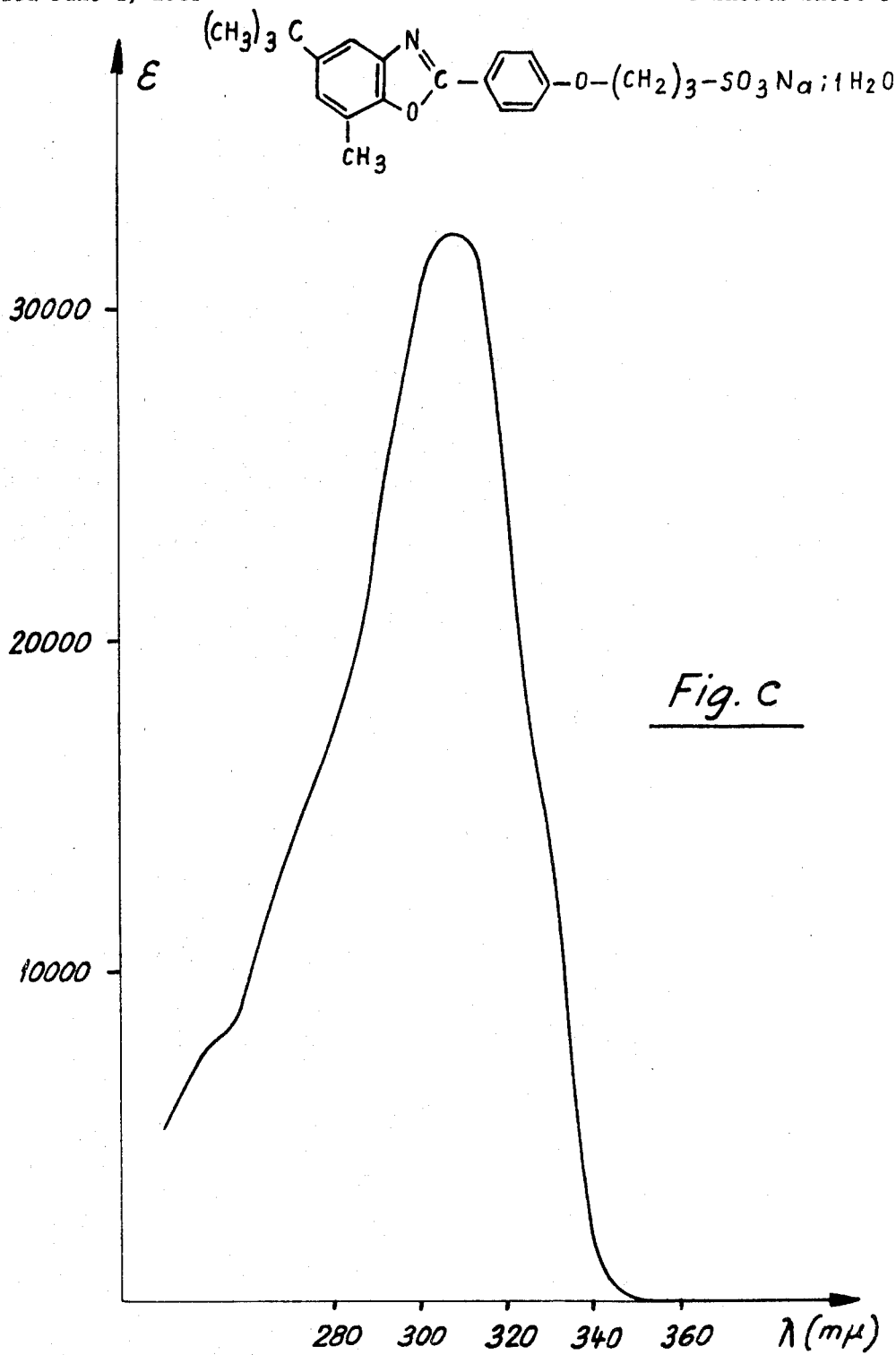
Fig. C

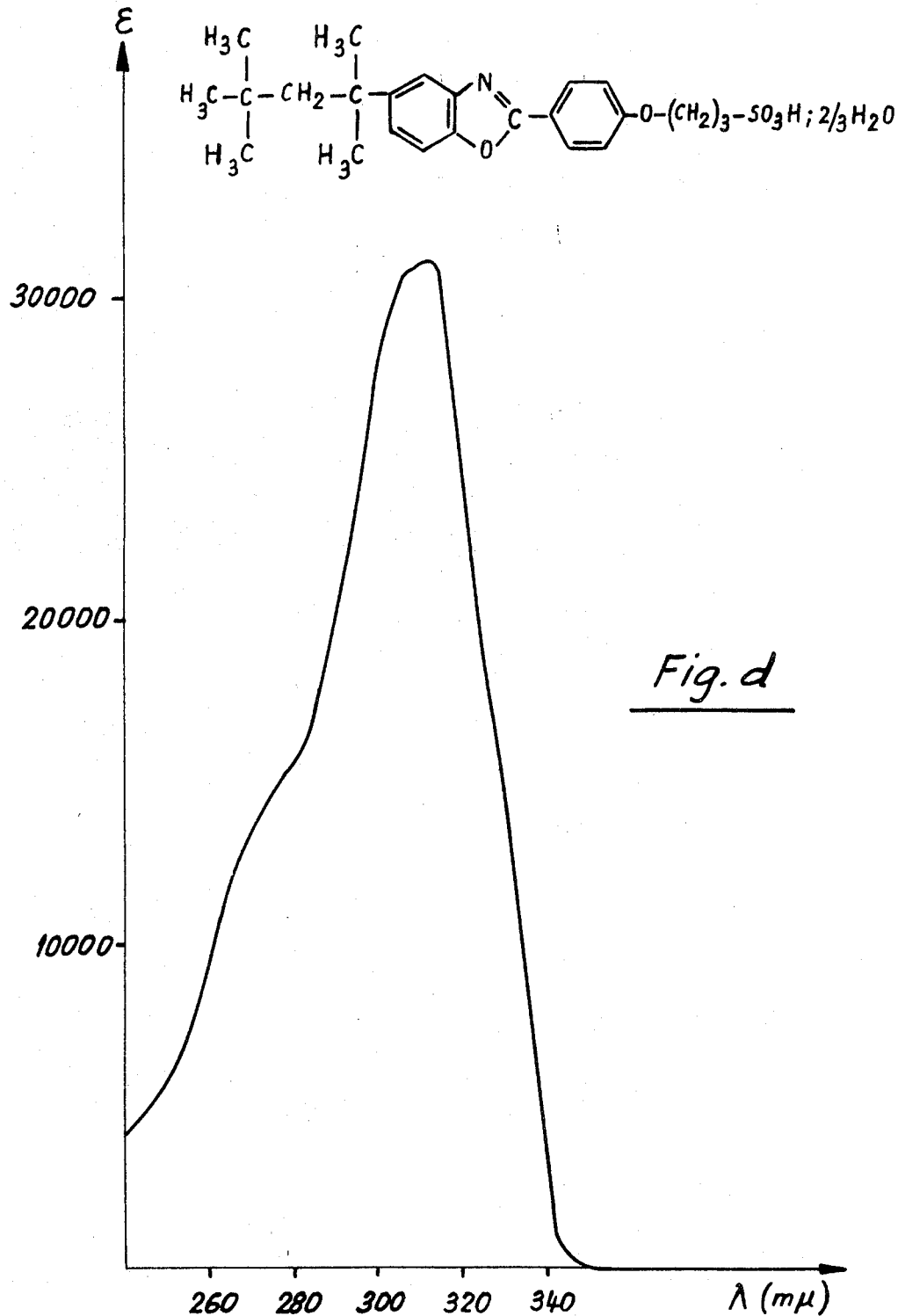
Fig. d

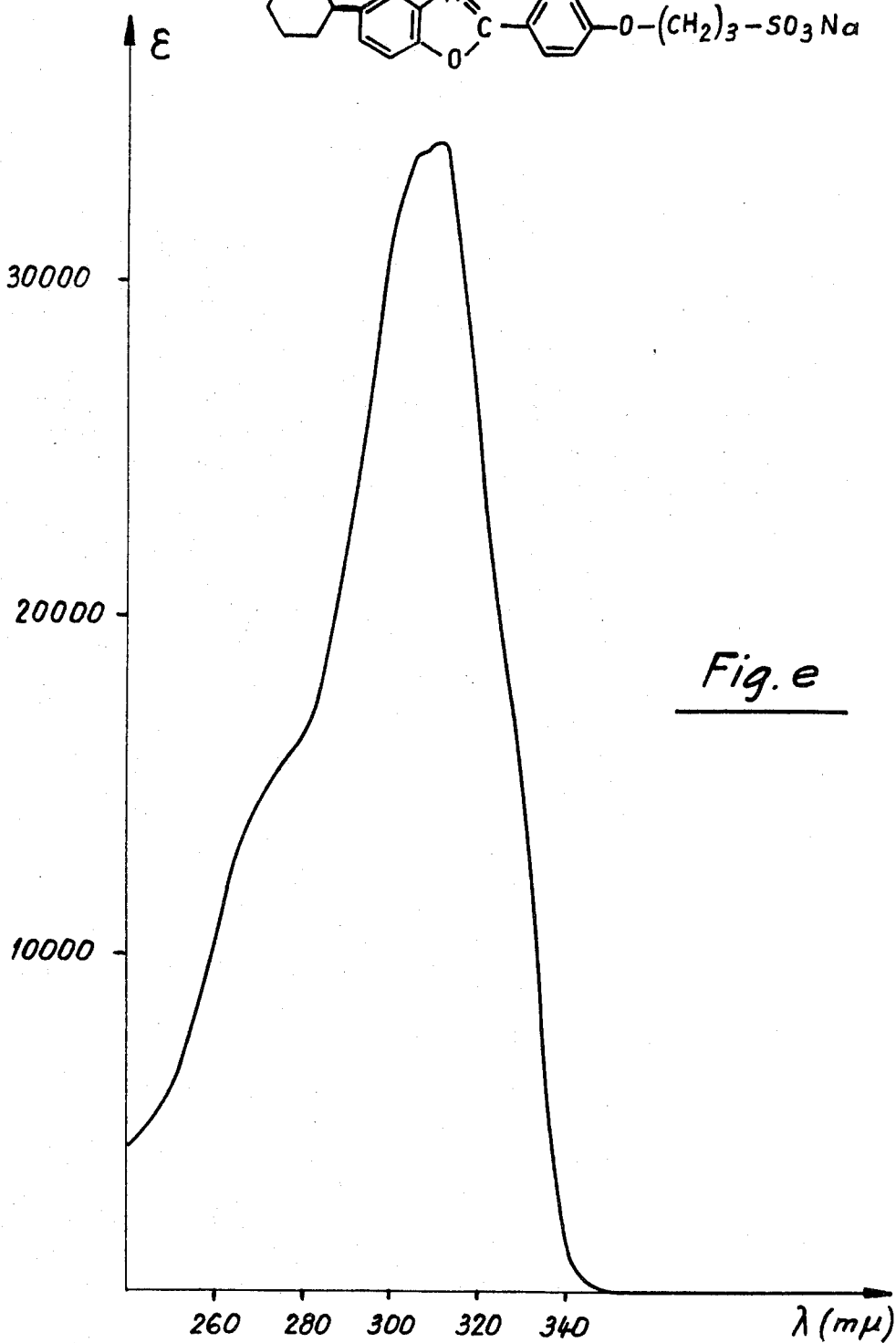
Fig. e

ABSTRACT OF THE DISCLOSURE 2-phenylbenzoxazoles of the formula

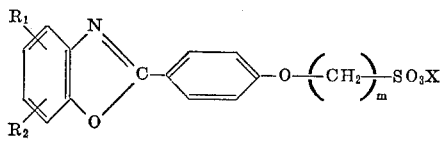

wherein $R_1$ stands for hydrogen, alkyl, phenylalkyl or cycloalkyl, $R_2$ stands for hydrogen or alkyl, $m$ is 3 or 4 and X a cation. These compounds are valuable ultraviolet absorbers for cosmetic purposes.

---

The present invention relates to new 2-phenylbenzoxazoles containing alkylsulphonic acid groups, a process for their manufacture as well as their use as ultraviolet absorbing agents for cosmetic purposes.

Various ultraviolet absorbing agents for cosmetic preparations have already been proposed, including substances based on 2-phenylbenzoxazole, but these, either as regards the absorption range or as regards the physiological behaviour, in no case fully meet practical requirements.

It has now been found that these disadvantages can surprisingly be overcome if 2-phenylbenzoxazole derivatives which correspond to formula (1) 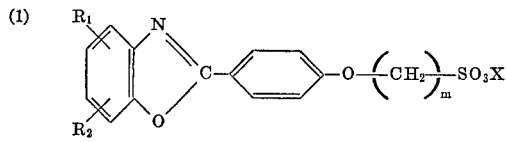

wherein $R_1$ denotes hydrogen, alkyl with 1 to 12 carbon atoms, phenylalkyl with 1 to 4 carbon atoms in the alkyl part or cycloalkyl, and $R_2$ denotes hydrogen or alkyl with 1 to 4 carbon atoms, $m$ represents the numbers 3 or 4, and X denotes a hydrogen, potassium, sodium, ammonium or substituted ammonium ion, are used as protective agents against ultraviolet radiation for cosmetic purposes.

Within the framework of the above definition of the residue $R_1$, the following meanings are preferred possibilities: for alkyl groups, those with 1 to 8 carbon atoms, for phenylalkyl groups phenylisopropyl, and for cycloalkyl, cyclohexyl. By the term of a substituted ammonium ion there are here to be understood the ammonium ions which are usually possible for amine salt formation, that is to say especially those of tertiary alkylamines, hydroxyalkylamines (for example diethanolamine or triethanolamine), alkylaralkylamines and the like.

Accordingly, phenylbenzoxazoles to be mentioned preferentially are those corresponding to formula (2) 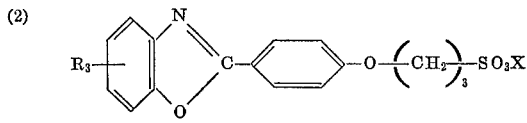

wherein $R_3$ denotes hydrogen, alkyl with 1 to 12 carbon atoms, preferably 1 to 8 carbon atoms, or cyclohexyl, and X denotes a hydrogen, potassium, sodium, ammonium or substituted ammonium ion.

Special interest attaches to compounds of formula (3) 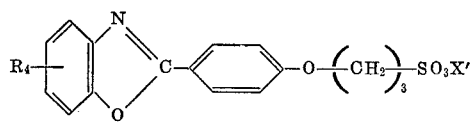

wherein $R_4$ represents hydrogen or an alkyl group containing 1 to 4 carbon atoms and X′ represents a cation of the series $H^{\oplus}$, $K^{\oplus}$ or $Na^{\oplus}$.

As 2-phenylbenzoxazole derivatives according to Formula 1 which can be used in accordance with the invention, the following compounds may for example be mentioned:

(4) 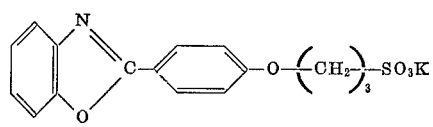

(4a) 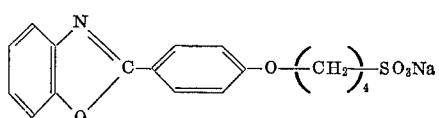

(4b) 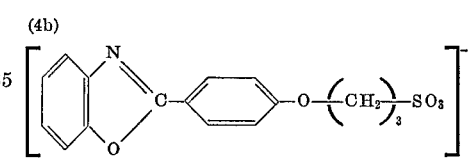

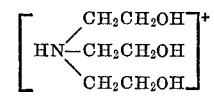

(4c) 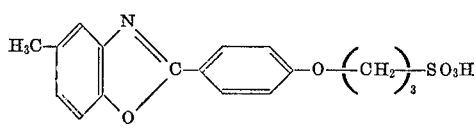

(4d) 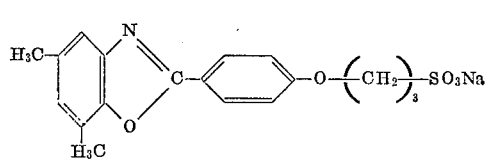

(4e) 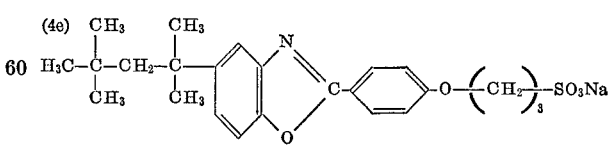

(4f) 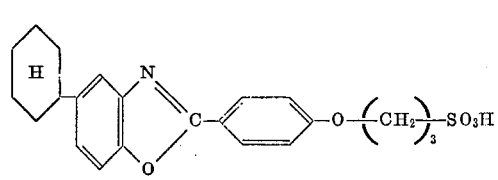

(4g) 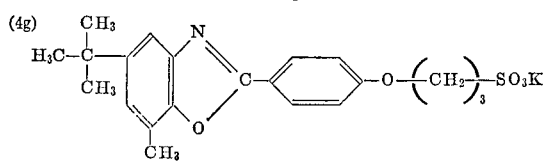

(4h) 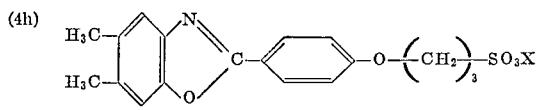

(4i) 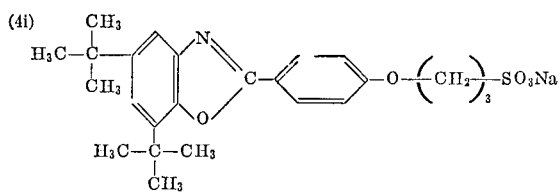

The manufacture of the 2-phenylbenzoxazole derivatives defined above can be conducted analogously to procedures which are in themselves known.

For this purpose, it is appropriate to synthesise the benzoxazole ring in a first stage by condensation of an aminophenol with a benzoic acid derivative according to the following formulae:

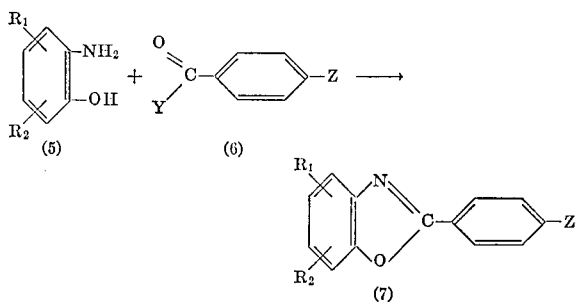

In this formula $R_1$ and $R_2$ have the same significance as that given under Formula 1, Y represents a halogen atom or a hydroxyl group and Z denotes —OH, —NH$_2$ or —O-acyl.

Depending on the physical and chemical nature of the components, this condensation can take place in bulk, (such as for example in the melt) or in solution, and in the latter case possible solvents are of course all those which on the one hand exert a sufficient solvent action and on the other hand are chemically inert towards the reagents (example: dichlorobenzenes). The possible temperature range for the reaction has largely to be suited to the reactivity of the components: in practice, the range of 150 to 250° C. is generally possible. The reaction is appropriately carried out in the presence of catalysts or auxiliary substances which cause the splitting off of water or favour splitting off of water, such as for example boric acid, p-toluene-sulphonic acid, phosphoric acids, sulphuric acid and the like. It is advantageous to convert the amide first formed (intermediate product) by heating the reagents into the corresponding benzoxazole compound by heating with phosphorus halides.

Suitable o-aminophenols according to Formula 5 are for example 1-amino-2-hydroxybenzene,
1-amino-2-hydroxy-4-methylbenzene,
1-amino-2-hydroxy-5-methylbenzene,
1-amino-2-hydroxy-3,5-dimethylbenzene,
1-amino-2-hydroxy-5-tert.butylbenzene,
1-amino-2-hydroxy-5-isooctylbenzene,
1-amino-2-hydroxy-3,5-di-tert.butylbenzene,
1-amino-2-hydroxy-3-tert.butyl-5-methylbenzene,
1-amino-2-hydroxy-4,5-dimethylbenzene,
1-amino-2-hydroxy-3-methyl-5-tert.butylbenzene and
1-amino-2-hydroxy-5-cyclohexylbenzene.

In the case where in Formula 7 Z=NH$_2$ or denotes —O-acyl, this group is converted into a hydroxyl group in a manner which is in itself known, for example by diazotisation of the amino group and decomposition by boiling in water, or saponification of the acyl grouping, respectively.

The compounds of formula

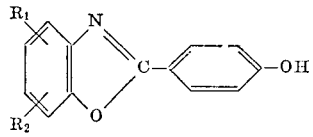

thus obtained are, in a second stage, condensed with approximately equimolar amounts of an alkanesultone of formula

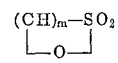

wherein $m$ represents 3 or 4, that is to say propanesultone or butanesultone. This condensation with alkanesultones is advantageously performed in an organic medium, for example in an organic solvent in which the alkanesultone dissolves but in which the hydroxy-phenylbenzoxazole does not have to be soluble. Acetone, alcohols such as ethanol and butanol, ethylene glycol monoethers, dioxane and dimethylsulphoxide may be mentioned as examples of such solvents. Furthermore, the condensation is advantageously carried out in the presence of an acid-binding agent such as alkali hydroxide (NaOH), alkali carbonate (K$_2$CO$_3$) or alkali alcoholate (NaOC$_2$H$_5$), and the process is advantageously carried out at elevated temperature, for example between 20° C. and the boiling point of the solvent.

By exchanging the alkali ion of the resulting alkali sulphonates, for example by means of ion exchangers, the free sulphonic acids can be isolated from the alkali sulphonates or the amine salts can be obtained by neutralising the free acids with equivalent quantities of amines.

The 2-phenyl-benzoxazole derivatives to be employed in accordance with the invention are suitable for use as agents for protecting the skin against ultraviolet radiation. They can be processed into stable and ready-to-use cosmetic preparations in a manner which is in itself known. They are appropriately mixed with carriers, or are emulsified.

Such carriers may be present in a liquid or semi-liquid form. This includes liquid organic diluents, for example organic solvents such as alcohols or ketones, for example ethanol, ispropanol, glycerine, cyclohexanol, methylcyclohexanol, and also trichlorethylene, petrol, and esters of vegetable or animal origin such as vegetable or animal oils and fats, for example groundnut oil, cacao butter and lanoline. It is also possible to use mineral solvents such as paraffin oil, white mineral oil, white petroleum oil or white petroleum jelly. If an aqueous emulsion of the protective agent is desired, then the latter can be emulsified as an aqueous solution in an organic medium (see above) which is not miscible with water, with the aid of suitable emulsifiers. Of course further substances can also be added to such mixtures and preparations, for example skin cosmetics, insect repellants, deodourants, scents, or dyestuffs. By suitable choice of one or more carriers and also optionally of further additives, solutions, ointments, pastes, creams, oils or emulsions are obtained.

Depending on the nature of the cosmetic preparations the latter can contain an amount of the 2-phenylbenzoxazoles to be employed according to the invention which varies within quite considerable limits.

For most practical purposes, possible amounts are generally between 0.05 and 5, preferably 0.5 to 3, percent by weight of 2-phenylbenzoxazole derivative relative to the total amount of the preparation.

The 2-phenylbenzoxazole derivatives to be used as protective agents in accordance with the present invention are particularly suitable for use as skin protection agents, because they show a very strong absorption in the range of 290 to 335 mμ and hence largely absorb the ultraviolet rays up to about 335 mμ which cause a reddening of the skin, but do not influence the rays of higher wavelength from 340 mμ onwards, the tanning effect of which is as a rule desired. Other compounds of similar constitution do not show this behaviour.

A decisive advantage of the 2-phenylbenzoxazole derivatives to be used in accordance with the invention resides in their water solubility behaviour—at the same time coupled with an absorption behaviour as characterised above. The water solubility of the compounds according to the invention varies—depending above all on the nature of the salt-forming cation—between about 0.5 and 20%. The solubility range of around 1% observed in several cases means in practice that such substances, when used as sun protection agents, can be less easily perspired away (the solubility being too low for this) whilst on the other hand they are sufficiently soluble to allow them to be washed away perfectly (in contrast to lipophilic ultraviolet absorbers which clog the pores of the skin and can in this way lead to skin irritations).

In the manufacturing instructions and examples which follow the parts, unless otherwise stated, denote parts by weight and the percentages denote percentages by weight.

(A) MANUFACTURING EXAMPLES

Example 1

10.55 g. of 2-(4'-hydroxyphenyl)-benzoxazole (manufactured for example according to J. Chem. Soc. 1954, 2256) and 2.85 g. of potassium hydroxide (98% pure) are dissolved in 100 ml. of ethylene glycol monomethyl ether at 20° C. A solution of 6.35 g. of propanesultone in 40 ml. of ethylene glycol monomethyl ether is then added and the mixture is stirred for 2 hours at 20° C., 5 hours at 35° C. and 16 hours at 50° C. The mixture is cooled for one hour to 0 to 5° C., filtered, and the residue rinsed with acetone. After recrystallisation from 60% strength alcohol 14.4 g. of the compound (4) 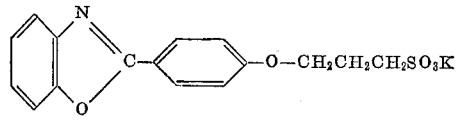

are obtained; this does not melt up to 320° C. and shows the following analytical data:

Calculated (percent): C, 51.74; H, 3.80; N, 3.77; S, 8.63. Found (percent): C, 51.82; H, 4.01; N, 3.84; S, 8.67.

Absorption behaviour: $\lambda_{max.}/\epsilon_{max.}$ 305/37200–310/37200 (double maximum).

Example 2

28.5 g. of the compound of Formula 4 are dissolved in 1500 ml. of 30% strength ethanol with warming. The solution, whilst still at 25 to 30° C., is subsequently charged onto an exchanger column filled with 60 g. (dry weight) of a cation exchanger (Dowex 50 Wx8, 20–50 mesh) in the H+ form. The eluate is completely concentrated and the residue redissolved in 400 ml. of n-butanol and 25 ml. of water. After distilling off 200 to 250 ml. of solution a product begins to precipitate; after ice-cooling, filtering, washing with 20 ml. of n-butanol and 40 ml. of acetone and drying, 18.7 g. of the compound of formula

(10) 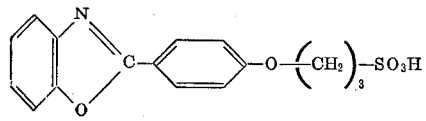

are obtained, melting at 245 to 248° C. and showing the following analytical data:

Calculated (percent): C, 57.65; H, 4.54; N, 4.20. Found (percent): C, 57.69; H, 4.72; N, 4.08.

Example 3

6.7 g. of the compound of Formula 10 are dissolved in 15 ml. of water at 80° C. and mixed with 6 ml. of ammonia (25% strength). The crystal sludge which initially precipitates dissolves on warming to reflux temperature. After adding 100 ml. of n-butanol the mixture is concentrated until crystals spontaneously precipitate, cooled and filtered, and the product rinsed with 20 ml. of n-butanol. 6.2 g. of the compound of formula

(11) 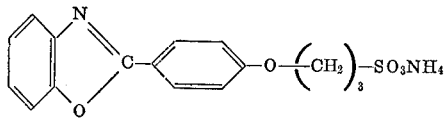

are thus obtained, melting at 302 to 308° C. with decomposition, and showing the following analytical data:

Calculated (percent): C, 54.84; H, 5.18; N, 8.00. Found (percent): C, 54.85; H, 4.92; N, 7.85.

Example 4

6.7 g. of the compound of Formula 10 are mixed with 4.2 g. of diethanolamine and warmed with 10 ml. of water to 90° C. 100 ml. of n-butanol are added to the resulting solution and 85 ml. of solvent are distilled off. The precipitate which spontaneously forms is filtered off and washed with 5 ml. of n-butanol and 25 ml. of benzene. After drying, 8.3 g. of the compound of formula

(12) 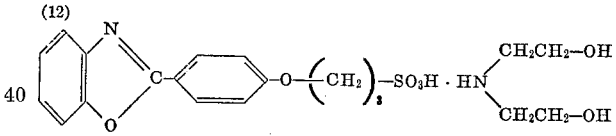

are obtained, melting at 147 to 148° C. Analytical data:

Calculated (percent): C, 54.78; H, 5.98; N, 6.39. Found (percent): C, 54.63; H, 6.01; N, 6.39.

Example 5

17.9 g. of 2-amino-4-tert.butyl-6-methylphenol, 13.8 g. of 4-hydroxybenzoic acid, 0.5 g. of boric acid and 0.2 g. of piperidine together with 25 ml. of trichlorobenzene are warmed to 150° C. The temperature is raised by 10° C. each half hour up to 220° C., at which temperature the mixture is stirred for a further 2 hours. In the course of this, 3.5 ml. of a water-trichlorobenzene mixture distil off. The residue is cooled, diluted with 25 ml. of benzene and filtered, and the residue rinsed with benzene. After recrystallisation from chlorobenzene 14 g. of the compound of formula

(13) 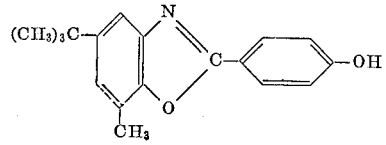

having a melting point of 249 to 251° C. are obtained.

8.4 g. of the compound of Formula 13 are reacted with 1.2 g. of solid sodium hydroxide and 3.9 g. of propanesultone in 60 ml. of ethylene glycol monomethyl ether in the manner described in Example 1. After completion of the reaction the reaction mixture is completely concentrated on a rotational evaporator. After recrystallisation from n-butanol and a little water, 7.5 g. of the compound of formula (14)

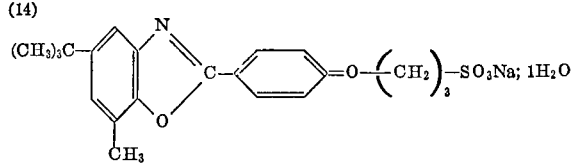

are obtained, sintering at 290° C. (loss of water) and only melting above 350° C. Analytical data:

Calculated (percent): C, 56.9; H, 5.92; N, 3.16. Found (percent): C, 57.1; H, 6.0; N, 3.2.

Example 6

If in Example 1 the propanesultone is replaced by the corresponding quantity of butanesultone and an analogous procedure is otherwise followed, then the product of formula (15)

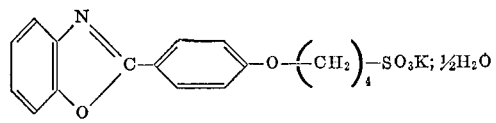

is obtained in similar yield; this sinters at 310° C. (loss of water) and does not melt up to 350° C. (from alcohol/water). Analytical data:

Calculated (percent): C, 51.7; H, 4.34; N, 3.55. Found (percent): C, 51.69; H, 4.36; N, 3.52.

Example 7

The following intermediate products are manufactured from the appropriate 2-aminophenols, analogously to the procedure described in Example 5:

(16)

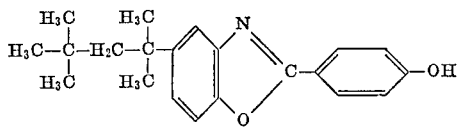

melting point: 211 to 212° C.

(17)

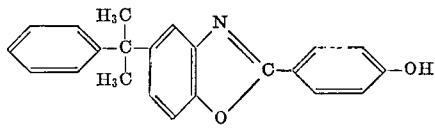

melting point: 228 to 229° C.

(18)

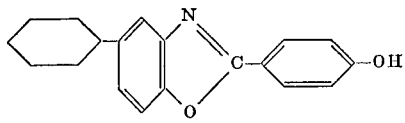

melting point: 229 to 230° C.

Analogously to the procedures described earlier, reaction of these intermediate products with propanesultone and alkali hydroxide yields the following compounds:

(19)

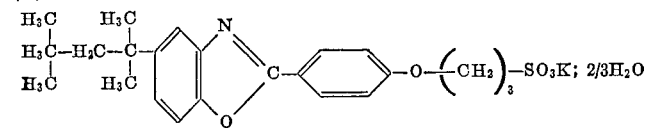

sintering at 220° C. (loss of water), not melted up to 350° C.; analytical data:

Calculated (percent): C, 58.2; H, 6.32; N, 2.83. Found (percent): C, 57.9; H, 6.34; N, 2.75.

(20)

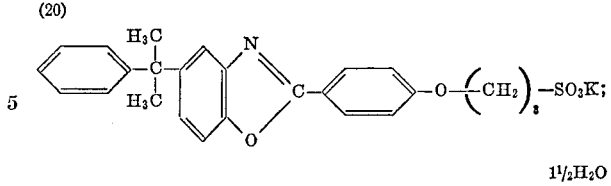

melted at 230 to 232° C. (loss of water), and re-solidifying; analytical data:

Calculated (percent): C, 58.1; H, 5.2; N, 2.7. Found (percent): C, 57.9; H, 4.9; N, 2.7.

(21)

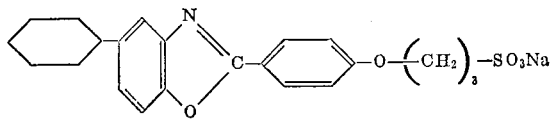

melting point: >340° C. Analytical data:

Calculated (percent): C, 60.40; H, 5.53; N, 3.20. Found (percent) C, 60.05; H, 5.73; N, 3.20.

(B) USE EXAMPLES

Example I 10 parts of glycerine monostearate, 4 parts of cetyl alcohol, 1 part of sodium cetyl sulphate and 1 part of stearic acid are intimately mixed and emulsified in a solution of 1 part of the compound of Formula 4 in 75 parts of water and 5 parts of glycerine (warmed to about 35 ° C.).

An emulsion is obtained which is very suitable for use as a non-greasy skin cream and which effectively protects the treated areas against sunburn.

If in the above formulation the compound of Formula 4 is replaced by 2 parts of the compounds of Formulae 11 or 21, or by 4 parts of the compounds of Formulae 12, 14, 19 or 20, emulsions are obtained which offer even more effective protection against sunburn.

Example II 2.5 parts of the compound of Formula 4 are dissolved in a mixture of 60 parts of water, 32.5 parts of fine spirit and 5 parts of propylene glycol. The sun protection agent thus obtained holds back harmful radiation (erythrogenically acting radiation) very powerfully but on the other hand transmits tanning radiation well.

If in the above formulation the compound of Formula 4 is replaced by one of the compounds of Formulae 11, 12, 14, 15, 19, 20 or 21, valuable sun protection agents are again obtained.

Example III

A cosmetic formulation is manufactured from 10 parts of cetiol (mixture of esters of unsaturated fatty acids obtained from spermaceti), 6 parts of stearin, 1.5 parts of triethanolamine, 3 parts of one of the compounds of Formulae 12, 14 or 20 and 79.5 parts of water. The sun protection agent thus obtained effectively keeps out the ultraviolet light rays which cause burn but transmits the greater part of the tanning rays.

Example IV 3 parts of one of the compounds of Formulae 12, 14, 19 or 20, 10 parts of glycerine monostearate, 4 parts of cetyl alcohol, 1-part of sodium cetyl sulphate, 1 part of stearic acid, 5 parts of glycerine and 75 parts of water are together worked up into an emulsion. A non-greasy skin cream is thus obtained which effectively protects the treated skin against sunburn.

(C) EXPLANATION OF THE FIGURES

In order to assess the suitability of the compounds described above as ultraviolet absorbers for cosmetic purposes, the ultraviolet absorption spectra in aqueous solution were recorded. The FIGS. (a) to (e) which follow show some characteristic spectra. The excellent filtering action of the substances in the erythrogenic radiation range (290 to 320 m$\mu$) can be seen from the height and position of the absorption maxima. The absorption effect up to about 340 m$\mu$ at the same time affords additional protection also for sensitive skin, without however excessively reducing the tanning part of the radiation, since the drop in absorption takes place very steeply.

The solubility of the above compounds in pure water (at 18° C.) varies depending on the nature of the salt and/or of the substituents, from about 0.5 up to more than 20%. In aqueous alcohol the solubility is normally even better. More sparingly water-soluble compounds are for example of interest for application in all cases where there is the possibility that if the water solubility is excessively good, the protection against sunburn, is excessively rapidly reduced on intense perspiration.

In FIGS. (a) to (e) the absorption spectra (extinction $e$ plotted against wavelength $\lambda$ in m$\mu$) are quoted for representative compounds according to the present invention.

I claim:
1. A 2-phenylbenzoxazole derivative of formula

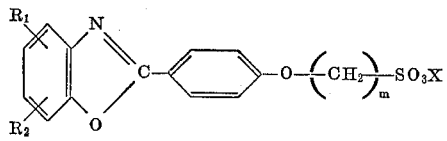

wherein $R_1$ denotes hydrogen, alkyl with 1 to 12 carbon atoms, phenylalkyl with 1 to 4 carbon atoms in the alkyl part or cyclohexyl, and $R_2$ denotes hydrogen or alkyl with 1 to 4 carbon atoms, $m$ represents the numbers 3 or 4 and X denotes a hydrogen, potassium, sodium, ammonium, bishydroxyethylammonium or trishydroxyethylammonium ion.

2. A 2-phenylbenzoxazole derivative according to claim 1, which corresponds to the formula

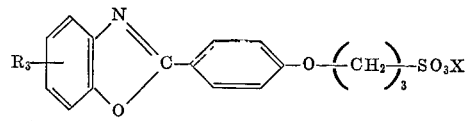

wherein $R_3$ denotes hydrogen, alkyl with 1 to 12 carbon atoms, or cyclohexyl, and X denotes a hydrogen, potassium, sodium, ammonium, bishydroxyethylammonium or trishydroxyethylammonium ion.

3. A 2-phenylbenzoxazole derivative according to claim 1, corresponding to formula

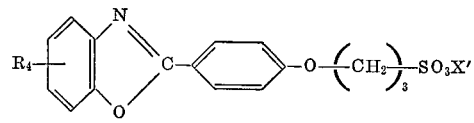

wherein $R_4$ represents hydrogen or an alkyl group containing 1 to 4 carbon atoms and X′ represents a cation of the series H⊕, K⊕ or Na⊕.

References Cited

UNITED STATES PATENTS 2,917,516   12/1959   Brooker et al. _____ 260—304

ALEX MAZEL, Primary Examiner

R. N. RUSH, Assistant Examiner

U.S. Cl. X.R.

424—59